United States Patent [19]

Johnson et al.

[11] Patent Number: 4,720,230

[45] Date of Patent: Jan. 19, 1988

[54] TRIPLE COMBINATION FLEXIBLE DISKETTE PICKER

[75] Inventors: Ronald R. Johnson, Shorewood; Dennis L. Johnson, Plymouth, both of Minn.

[73] Assignee: Information Exchange Systems, Inc., Shorewood, Minn.

[21] Appl. No.: 861,582

[22] Filed: May 9, 1986

[51] Int. Cl.⁴ .............................................. B65G 59/06
[52] U.S. Cl. ................................... 414/131; 221/242; 221/268; 271/131; 271/165
[58] Field of Search ....................... 221/241, 242, 268; 414/115, 131, 125; 271/165, 167, 171, 138, 131, 142, 144

[56] References Cited

U.S. PATENT DOCUMENTS 2,667,979  2/1954  French .............................. 414/131
3,972,423  8/1976  Tipton .............................. 294/64.1 X

FOREIGN PATENT DOCUMENTS 56353  12/1974  Australia .............................. 221/242

Primary Examiner—Robert J. Spar
Assistant Examiner—Janice Krizek
Attorney, Agent, or Firm—Orrin M. Haugen; Thomas J. Nikolai; Frederick W. Niebuhr

[57] ABSTRACT

An automatic flexible diskette picker for selectively ejecting flexible diskettes, one-at-a-time, from a stack of such diskettes. The picker comprises a stationary deadplate upon which a hopper containing a plurality of stacked diskettes of a given size is disposed. A gate device is affixed to the deadplate at a forward edge thereof and the gate has an aperture pattern for allowig the exit of diskettes of differing width and height dimensions therethrough, one-at-a-time. A motor-driven picker plate is disposed on the deadplate and reciprocally movable toward and away from the gate. The picker plate has a plurality of stepped vertical pick surfaces formed therein for accommodating diskettes of differing sizes. Thus, the device may be used to unstack, at different times, hoppers filled with floppy disks of the different sizes presently commercially available.

3 Claims, 5 Drawing Figures

TRIPLE COMBINATION FLEXIBLE DISKETTE PICKER

BACKGROUND OF THE INVENTION

I. Field of the Invention

This invention relates generally to apparatus for automatically feeding flexible data storage diskettes, one-at-a-time, to a conveyor mechanism, and more particularly to a diskette picker device for unstacking a hopper filled with such flexible diskettes for entry onto the conveyor mechanism.

II. Discussion of the Prior Art

With the advent of small, personal computers, there has been a continuing demand for application programs ranging from amusement games to rather sophisticated small-business accounting packages. Such programs are commonly stored on a flexible magnetic medium contained in a flexible plastic jacket and which are commonly referred to as floppy-disks. Because of the demand for these programs, an industry has developed for the mass publication of software on flexible diskette media. Equipment is now available for rapidly making copies of programs recorded on a master diskette, and these systems require the automatic feeding of individual blank floppy disks from a supply hopper to a disk transport station where writing and verification takes place. For example, in application Ser. No. 690,514, filed Jan. 10, 1985, now U.S. Pat. No. 4,571,645, there is described a machine for rapidly loading, sorting and collating flexible diskettes. IXI Laboratories, Inc., the assignee of the above-referenced application, makes a wide range of products which require the automatic loading and unloading of a floppy-disk drive as a part of its normal operation.

In the aforementioned application, there is illustrated and described a picker system 22 which is operable to remove the lowermost floppy-disk from a stack of such disks contained within a hopper 23. The picker unit comprises a motor having a picker blade coupled thereto through an eccentric. The picker blade engages the bottommost diskette in a stack and pushes only that bottom diskette through a gate to a diskette conveyor. In that prior art machine, the opening in the gate and the picker blade are designed such that the picker unit 22 can only operate with a single-size diskette. There are on the market, however, diskettes which are 3-inch, 3¼inch, 3½-inch, 5¼-inch and 8-inch square as standard sizes. It is highly desirable that a picker unit be able to accommodate diskettes of each of these sizes so that the equipment involved can selectively utilize any of the aforementioned disk sizes.

SUMMARY OF THE INVENTION

In accordance with the present invention, there is provided a picker blade and an associated gate whereby hoppers filled with any one of the above sizes of diskettes can be interchangeably positioned on the deadplate, and the picker blade and gate will insure that only the bottommost diskette in the particular hopper being used will be picked and ejected through the gate. This is achieved by providing a plate-like picker blade having a plurality of stepped vertical pick surfaces formed thereon, each of the vertical surfaces being a predetermined distance from the forward edge of the blade. Means are provided for reciprocally moving the picker blade in a forward and rearward direction, toward and away from a gate positioned at the forward edge of the deadplate and which has an aperture pattern therein in appropriate alignment with the respective vertical diskette engaging surfaces of the picker blade so that only the bottommost diskette in the hopper will be selected and ejected. The particular one of the vertical pick surfaces engaging the diskette depends upon the size of the diskette contained in the particular hopper positioned on the deadplate.

OBJECTS

It is accordingly a principal object of the present invention to provide a new and improved data storage diskette picker mechanism.

Another object of the invention is to provide a diskette picker which can be used with a multiplicity of different diskette sizes.

Yet another object of the invention is to provide, in combination, a reciprocating picker blade having a plurality of disk-engaging surfaces formed thereon for cooperating with the bottommost disk on a stack of disks and ejecting that disk through a corresponding opening in a gate member.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
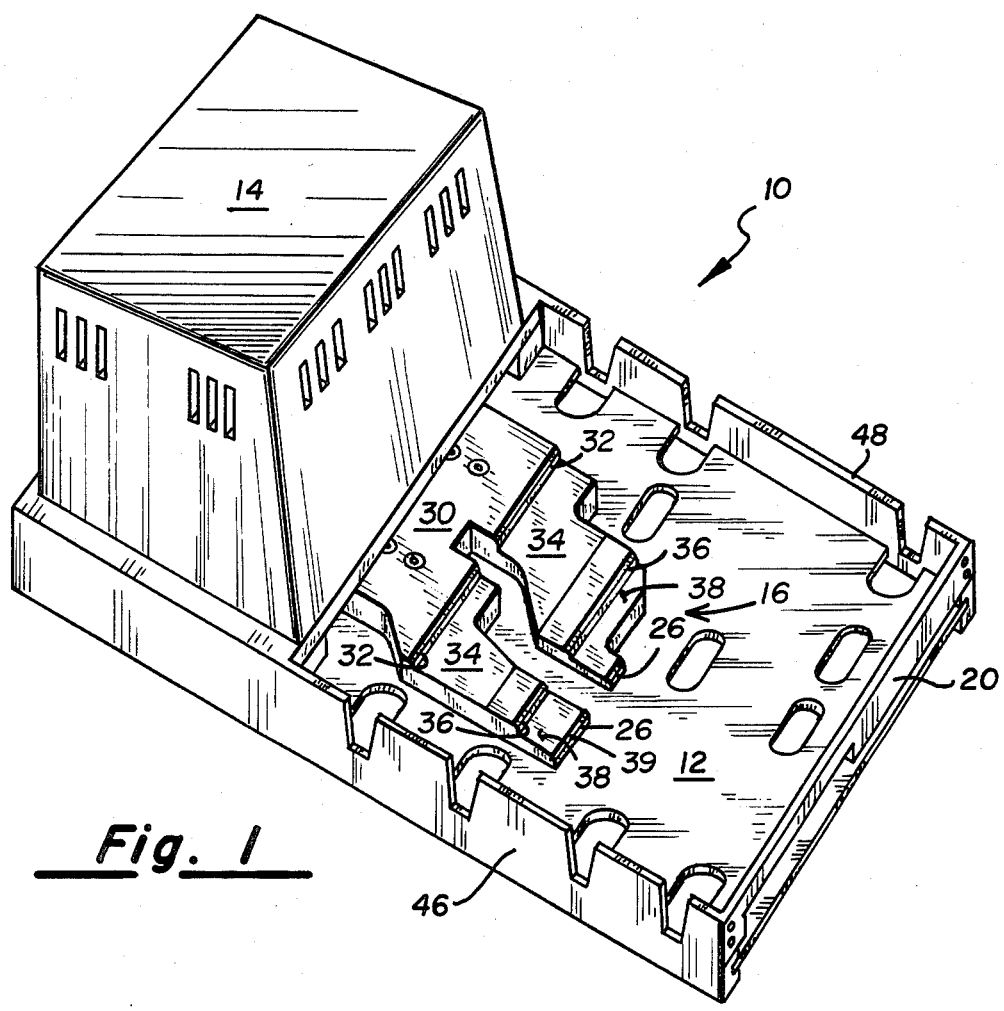
FIG. 1 is a perspective view of a diskette picker assembly incorporating the picker blade of the present invention.

Referring to FIG. 1, there is shown a perspective view of a picker assembly adapted for use in diskette handling apparatus such as that described in the afore-referenced application Ser. No. 690,514, filed Jan. 10, 1985, now U.S. Pat. No. 4,571,645. As indicated, the function of the picker assembly of FIG. 1 is to selectively remove the bottommost diskette from a stack of such diskettes contained in a hopper which is positioned at differing locations on the deadplate 12, the position depending upon the size of the diskette being fed. Specifically, the most common sizes for magnetic storage diskettes are 3-inch, 3¼-inch, 3½-inch, 5¼-inch and 8-inch. The hopper itself is not shown in the drawings so that the underlying structural features of the picker assembly can be observed. The hopper can be observed, however, in the drawings of application Ser. No. 690,514, now U.S. Pat. No. 4,571,645. Also disposed on the deadplate 12 is a drive motor which is located beneath the housing cover 14. As in the above-cited application, the motor is coupled through an eccentric (not shown) for imparting reciprocating motion to the picker blade 16.

Attached to the front edge of the deadplate 12 is a gate member 20 whose configuration will be explained in greater detail later on with reference to FIG. 5.

Figure 2:
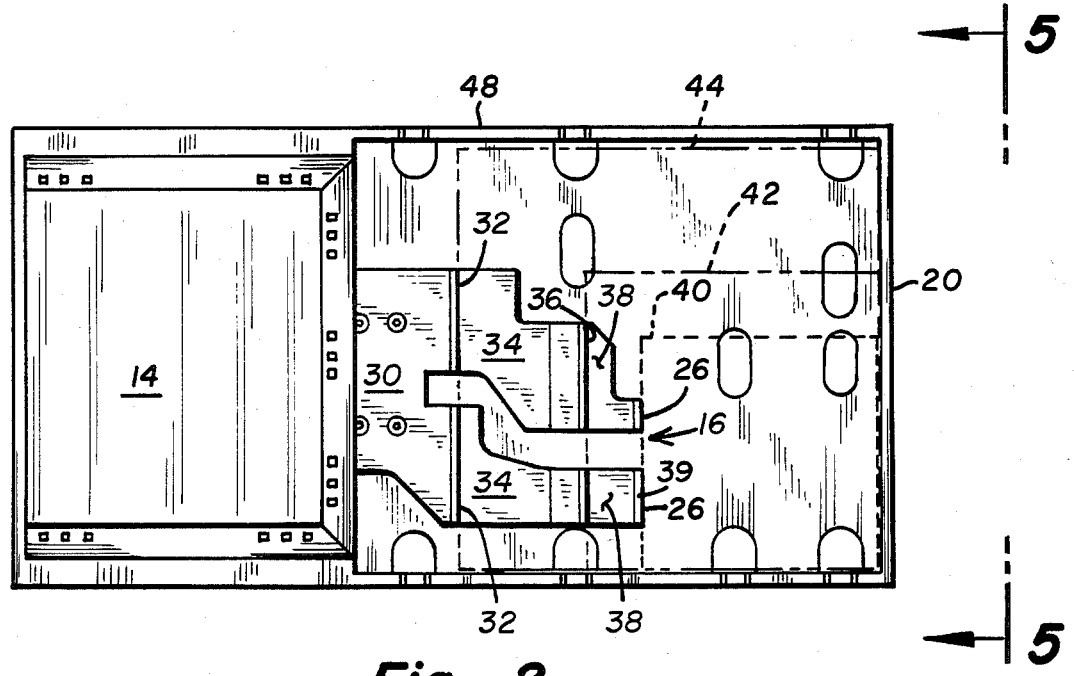
FIG. 2 is a top plan view of the picker assembly showing the manner in which various size diskettes are engaged by the picker blade.
Figure 3:
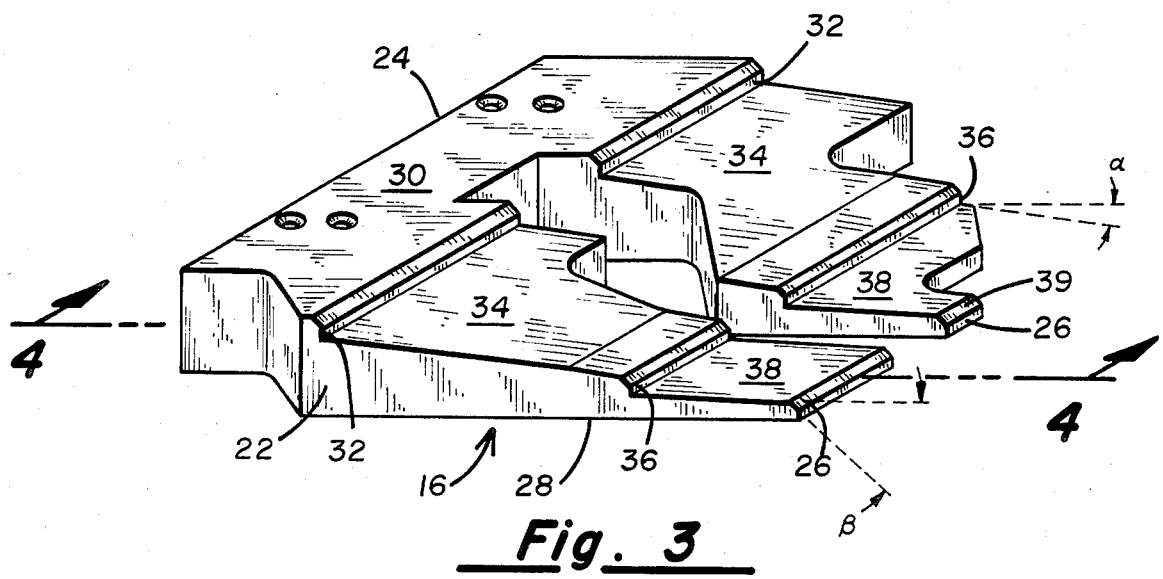
FIG. 3 is a perspective view of the picker blade itself.

As can be seen from FIGS. 1 through 4, the picker blade comprises a block 22, which may be made from aluminum, and which is preferably coated with a Teflon material to provide a relatively friction-free surface. Alternatively, the picker plate may be fabricated from a suitable plastic, such as Delrin. The block 22 has a rear edge 24, a front vertical edge 26, a generally flat bottom surface 28 and a top surface 30. Molded or otherwise formed in the block 22 is a first vertical edge 32 and a downwardly sloping surface 34 leading to a further vertical edge 36. Between the vertical edge 36 and the front edge 26 of the block 22 is a first downwardly sloping surface 38, which makes a first predetermined angle ($\alpha$) with respect to the horizontal shown by dotted line 41 followed by a larger downwardly sloping angle ($\beta$) defining a surface 39, all as depicted in FIG. 3.

As shown in the broken rectangle in the plan view of FIG. 2, the picker blade or plate is configured to work with any of the above-identified standard sizes of floppy-disks. For example, the front vertical edge surface 26 of the picker plate 16 is spaced a sufficient distance inward from the gate 20 to accommodate so-called micro-disks or micro-cartridges, e.g., those having a rectangular dimension of 3-inch, 3¼-inch or 3½-inch. This particular size cartridge is identified by numeral 40 in FIG. 2. Similarly, the vertical edge 36 of the picker plate 16 is configured such that a 5¼-inch standard floppy-disk 42 may fit between it and the gate plate 20 when the picker plate 16 is at the furthest extent of its rearward stroke. Finally, the dimensions of the picker plate 16 are such that the vertical edge 32 is spaced from the gate plate 20 a sufficient distance to accommodate a standard 8-inch floppy-disk 44.

Figure 5:
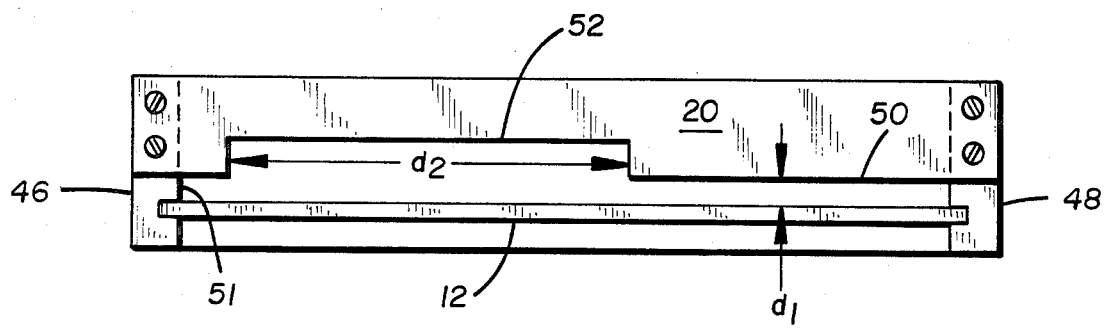
FIG. 5 is a front view of the gate portion of the picker assembly of FIG. 1.

Referring next to FIG. 5, the gate plate 20 is fastened between the side walls 46 and 48 of the picker assembly 10, and the lower edge 50 thereof is spaced a predetermined distance, $d_1$, above the upper surface of the deadplate 12. This distance, $d_1$, is slightly greater than the thickness dimension of a standard 5¼-inch or 8-inch floppy-disk but less than the thickness of two such disks arranged one atop the other. The gate plate 20 is further notched, as at 52, the notch being a distance, $d_2$, across. The height and width dimensions of the notch 52 above the deadplate 12 are greater than the normal thickness of a 3-inch or 3.5-inch diskette cartridge but less than two such cartridges. The 5¼-inch and 8-inch diskettes are, of course, too wide to fit through the notch of width $d_2$.

When a hopper filled with 8-inch diskettes is placed upon the upper surface of the deadplate 12, it may exit sufficiently far through the slot 50 when the picker is driven in its forward direction to be picked up by the conveyor mechanism (not shown). This same slot will permit only one 5¼-inch floppy-disk to exit through the notch 50 with the side edge of the diskette riding along the inner side surface 51 of the side wall 46. The thickness dimension of a typical 3-inch or 3.5-inch floppy-diskette cartridge makes it impossible for the cartridge to fit between the lower edge 50 on the gate 20, but it can slide beneath the edge 52 of the notched portion in the gate. When using these smaller size microdiskettes, the hopper containing them is appropriately fitted on the base plate 12 so that the diskettes will be aligned with the notch 52.

Figure 4:
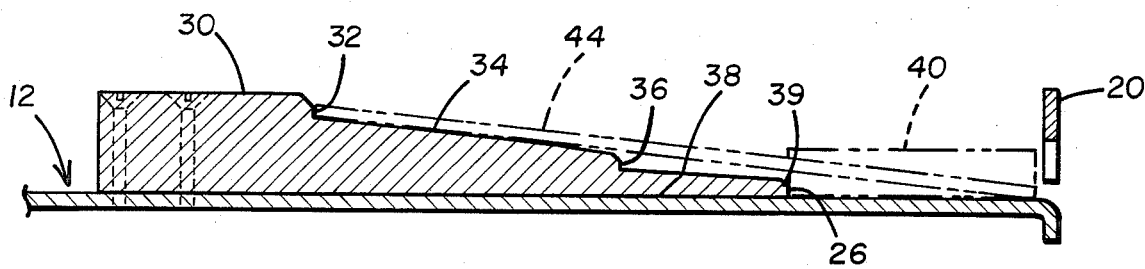
FIG. 4 is a side elevation of the picker blade assembly mounted on the deadplate and showing the manner in which various size disks are oriented relative to the picker gate.

A further feature of the picker plate of the present invention can be observed in FIG. 4. Here there is illustrated a cross-sectional view taken along the line 4—4 in FIG. 3 and which shows the 3-inch or 3½-inch cartridge 40 positioned on the upper surface of the deadplate 12 and being engaged by the front vertical surface 26 of the picker plate. The height dimension is such that it can only pass through the notched portion 52 of the gate plate 20. It can also be observed that the 8-inch floppy-disk, when resting on the sloping surfaces 34 and 39, causes the leading edge thereof to be positioned so as to slip below the lowermost edge 50 of the gate plate 20 through the gap $d_1$. The downwardly sloped surface 38 of the picker plate 16 allows a 5¼-inch floppy-disk to lie thereon so that it is also directed at an appropriate angle to fit beneath the lower edge 50 of the gate plate 20 and not be caught on the gate. To avoid confusion in the drawings, a dotted line representation of the 5¼floppy-disk 42 (FIG. 2) has not been illustrated.

By way of summary, then, the present invention constitutes a valuable improvement over the prior art picker mechanism described in the aforereferenced application Ser. No. 690,514, filed Jan. 10, 1985, now U.S. Pat. No. 4,571,645. Rather than being restricted to handling only a single size diskette, the picker assembly 10 of the present invention may be used with hoppers containing any of the now standard size floppy-diskettes and disk cartridges. This is achieved by providing a picker blade or plate having vertical diskette edge-engaging surfaces accurately dimensioned relative to a gate plate so that, irrespective of the size of the diskette in question, when positioned on the deadplate 12, it will have their front-most edge close to the gate plate 20 when the picker plate is in its extreme rearward position of its reciprocatory travel. Cooperating with the picker plate, then, is a gate member which is provided with a notch and which is positioned a predetermined distance above the top surface of the deadplate 12 so that only one diskette at a time may exit through the appropriate opening. The picker plate has downwardly sloping surfaces where the slope is at an appropriate angle to orient the leading edge of the diskette at an appropriate disposition to insure that only one diskette at a time may exit its appropriate opening without hooking or snagging the gate member 20.

While there has been shown and described a preferred embodiment of the invention, those skilled in the art will recognize that various changes and modifications may be made to this embodiment while still remaining within the scope of protection defined by the appended claims.

What is claimed is:

1. A picker assembly for ejecting data storage diskettes, one at a time, from the bottom of a hopper containing a stack of such diskettes, where all of the diskettes in a given size hopper are of one of a plurality of differing length, width and thickness dimensions, comprising:
   (a) a stationary dead plate;
   (b) means for selectively positioning one of a plurality of different sized hoppers containing storage diskettes of corresponding size upon said stationary dead plate at one of a plurality of predetermined locations thereon;
   (c) gate means affixed to said dead plate at a forward edge thereof, said gate means having an aperture pattern defining a plurality of apertures therein for allowing exit of diskettes of differing width and height dimensions therethrough, one at a time;

(d) picker plate means having a forward edge surface and a plurality of stepped vertical pick surfaces formed thereon a predetermined distance rearward from said forward edge surface, each of said predetermined distances corresponding to a size dimension of different ones of said diskettes, said pick surfaces being separated from each other by an inclined plane surface;

(e) means for reciprocally moving said picker plate means in a forward and rearward direction toward and away from said gate means, respectively, atop said stationary dead plate and beneath said hopper, only one of said vertical pick surfaces engaging the rearward edge of a bottom one of said diskettes in said hopper to advance said bottom diskette through said aperture in said gate means, the particular vertical pick surface engaging the diskette depending upon the size of the diskette contained in the hopper, the engagement of said rearward edge of the bottom one of said diskettes effecting placement of the bottom one of said diskettes on an inclined plane surface thereby aiming the leading edge of said bottom one of said diskettes toward the portion of said aperture pattern through which said diskettes in said one hopper are capable of passing.

2. The assembly as in claim 1 wherein said inclined plane surfaces of said picker plate means have a smooth, low friction characteristic.

3. The assembly as in claim 1 wherein said hoppers may contain a stack of diskettes of either 3-inch, 3¼-inch, 3½-inch, 5¼-inch or 8-inch wide diskettes.

* * * * *